US012437598B2

(12) United States Patent
Rasmussen

(10) Patent No.: US 12,437,598 B2
(45) **Date of Patent: *Oct. 7, 2025**

(54) COIN SORTING DISC WITH COIN FLOW MANAGEMENT FEATURES

(71) Applicant: Cummins-Allison Corp., Mount Prospect, IL (US)

(72) Inventor: James M. Rasmussen, Chicago, IL (US)

(73) Assignee: Cummins-Allison Corp., Mount Prospect, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,559

(22) Filed: Nov. 30, 2023

(65) Prior Publication Data

US 2024/0096161 A1 Mar. 21, 2024

Related U.S. Application Data

(63) Continuation of application No. 17/383,247, filed on Jul. 22, 2021, now Pat. No. 11,847,879.

(60) Provisional application No. 63/059,650, filed on Jul. 31, 2020.

(51) Int. Cl.
*G07D 3/12* (2006.01)
*G07D 9/00* (2006.01)
*G07D 5/02* (2006.01)

(52) U.S. Cl.
CPC ............. *G07D 3/128* (2013.01); *G07D 9/008* (2013.01); *G07D 5/02* (2013.01); *G07D 2205/00* (2013.01)

(58) Field of Classification Search
CPC ...... G07D 3/128; G07D 5/02; G07D 2205/00; G07D 9/008; G07D 3/12; G07D 3/00
See application file for complete search history.

(56) References Cited

U.S. PATENT DOCUMENTS

| | | | |
|---|---|---|---|
| 4,086,928 | A | 5/1978 | Ristvedt et al. |
| 4,506,685 | A | 3/1985 | Childers et al. |
| 4,543,969 | A | 10/1985 | Rasmussen |
| 4,564,037 | A | 1/1986 | Childers et al. |
| 4,586,522 | A | 5/1986 | Taipale et al. |
| 4,775,353 | A | 10/1988 | Childers et al. |
| 4,775,354 | A | 10/1988 | Rasmussen et al. |
| 5,009,627 | A | 4/1991 | Rasmussen |
| 5,106,338 | A | 4/1992 | Rasmussen et al. |
| 5,141,443 | A | 8/1992 | Rasmussen et al. |
| 5,163,867 | A | 11/1992 | Rasmussen |

(Continued)

*Primary Examiner* — Jeffrey A Shapiro

(57) ABSTRACT

A coin processing system comprises a rotatable disc including a resilient pad coupled thereto for imparting motion to the plurality of coins, the resilient pad including an outer peripheral edge, and a stationary sorting head. The stationary sorting head includes a lower surface forming a coin path for directing movement of each of the coins, a stripping area of the coin path including at least one stripping surface operable to retain at least one coin when overlapping another coin such that the other coin is separated from the at least one coin by the motion imparted by the rotatable disc, and a queuing area of the coin path that receives the plurality of coins from the stripping area, the queuing area including a beveled surface curving substantially parallel with the outer peripheral edge of the resilient pad to guide the coins in a single file configuration to a discrimination area.

10 Claims, 11 Drawing Sheets

(56) References Cited

U.S. PATENT DOCUMENTS

| | | | | |
|---|---|---|---|---|
| 5,194,037 | A | 3/1993 | Jones et al. | |
| 5,209,696 | A | 5/1993 | Rasmussen et al. | |
| 5,277,651 | A | 1/1994 | Rasmussen et al. | |
| 5,286,226 | A | 2/1994 | Rasmussen | |
| 5,299,977 | A | 4/1994 | Mazur et al. | |
| 5,382,191 | A | 1/1995 | Rasmussen | |
| 5,425,669 | A | 6/1995 | Geib et al. | |
| 5,429,550 | A | 7/1995 | Mazur et al. | |
| 5,453,047 | A | 9/1995 | Mazur et al. | |
| 5,474,497 | A | 12/1995 | Jones et al. | |
| 5,480,348 | A | 1/1996 | Mazur et al. | |
| 5,489,237 | A | 2/1996 | Geib et al. | |
| 5,507,379 | A | 4/1996 | Mazur et al. | |
| 5,514,034 | A | 5/1996 | Jones et al. | |
| 5,542,880 | A | 8/1996 | Geib et al. | |
| 5,564,978 | A | 10/1996 | Jones et al. | |
| 5,782,686 | A | 7/1998 | Geib et al. | |
| 5,865,673 | A | 2/1999 | Geib et al. | |
| 6,039,644 | A | 3/2000 | Geib et al. | |
| 6,042,470 | A | 3/2000 | Geib et al. | |
| 6,171,182 | B1 | 1/2001 | Geib et al. | |
| 6,755,730 | B2 * | 6/2004 | Geib | G07D 5/08 453/3 |
| 6,945,864 | B2 | 9/2005 | Hino et al. | |
| 7,427,230 | B2 | 9/2008 | Blake et al. | |
| 7,743,902 | B2 * | 6/2010 | Wendell | G07D 3/00 453/57 |
| 10,181,234 | B2 | 1/2019 | Rasmussen et al. | |
| 10,679,449 | B2 | 6/2020 | Rasmussen | |
| 11,847,879 | B2 * | 12/2023 | Rasmussen | G07D 3/128 |
| 2006/0148394 | A1 * | 7/2006 | Blake | G07D 3/128 453/12 |
| 2008/0261505 | A1 | 10/2008 | Bellis | |
| 2015/0269803 | A1 * | 9/2015 | Starke | G07D 3/128 453/12 |
| 2018/0108198 | A1 * | 4/2018 | Rasmussen | G07D 3/128 |
| 2019/0130690 | A1 | 5/2019 | Rasmussen | |

* cited by examiner

COIN SORTING DISC WITH COIN FLOW MANAGEMENT FEATURES

CROSS-REFERENCE TO RELATED APPLICATIONS

This application is a continuation of application Ser. No. 17/383,247, filed Jul. 22, 2021, which claims priority to U.S. Provisional Application No. 63/059,650, filed Jul. 31, 2020, the disclosures of which are incorporated herein by reference.

TECHNICAL FIELD

The present disclosure relates generally to coin sorting devices and, more particularly, to a coin sorting disc with improved coin flow management features.

BACKGROUND

Generally, disc-type coin sorters sort coins according to the diameter of each coin. Typically, in a given coin set such as the United States coin set, each coin denomination has a different diameter. Thus, sorting coins by diameter effectively sorts the coins according to denomination.

Disc-type coin sorters typically include a resilient pad (disposed on a rotating disc) that rotates beneath a stationary sorting head having a lower surface positioned parallel to the upper surface of the resilient pad and spaced slightly therefrom. The rotating resilient pad presses coins upward against the sorting head as the pad rotates. The lower surface of the sorting head includes a plurality of shaped regions including exit slots for manipulating and controlling the movement of the coins. Each of the exit slots is dimensioned to accommodate coins of a different diameter for sorting the coins based on diameter size. As coins are discharged from the sorting head via the exit slots, the sorted coins follow respective coin paths to sorted coin receptacles where the sorted coins are stored.

Although disc-type coin sorters have been previously used, problems are still encountered in this technology.

SUMMARY

This disclosure provides a coin sorting disc with improved coin flow management features.

Disc-type coin sorters can include, for example, an entry area deep enough that the thickest coin may freely enter under the disc via centrifugal force. However, this depth will also, at times, allow a stacked or overlapping pair of coins to enter as well. It is desirable that coins under the disc be arranged in a single file, single layer, condition to best achieve efficient flow. In order to arrive at this condition, disc geometry can be provided to separate doubled, or stacked, coins. One such configuration is described in U.S. Pat. No. 10,181,234, incorporated by reference herein in its entirety. While the geometry disclosed in U.S. Pat. No. 10,181,234 is effective to some extent to separate doubled or stacked coins, a more reliable and early separation of coin would ease the burden on downstream stripping features and greatly improve the efficiency of the overall system and a more orderly stream of coin.

According to various embodiments, a coin processing system for processing a plurality of coins of a mixed plurality of denominations having a plurality of diameters, comprises a rotatable disc including a resilient pad coupled thereto for imparting motion to the plurality of coins, the resilient pad being generally circular and including an outer peripheral edge, and a stationary sorting head. The stationary sorting head includes a lower surface generally parallel to and spaced a distance from the resilient pad, the lower surface forming a coin path for directing movement of each of the plurality of coins, a stripping area of the coin path including at least one stripping surface operable to retain at least one coin when overlapping another coin such that the other coin is separated from the at least one coin by the motion imparted by the rotatable disc, and a queuing area of the coin path that receives the plurality of coins from the stripping area, the queuing area including a beveled surface curving tangentially with the outer peripheral edge of the resilient pad to guide the coins in a single file configuration to a discrimination area.

In certain embodiments, the stripping area includes a first stripping ramp located at an initial edge of the stripping area and structured with an angle from the lower surface in a first direction that is tangential to a rotation of the rotatable disc.

In certain embodiments, the angle of the first stripping ramp increases in a second direction that is a radial direction of the rotatable disc.

In certain embodiments, an increase in the angle of the first stripping ramp is constant across the stripping area in the second direction.

In certain embodiments, the coin processing system further includes a second stripping ramp located in the second direction, towards a center of the rotatable disc, from the first stripping ramp.

In certain embodiments, the second stripping ramp is located in a counterclockwise direction in the first direction.

In certain embodiments, an angle of the second stripping ramp increases in the second direction.

In certain embodiments, an increase in the angle of the second stripping ramp is less than the increase of the angle of the first stripping ramp.

In certain embodiments, the angle of the second stripping ramp is constant across the stripping area in the second direction and the angle of the second stripping ramp is different from the angle of the first stripping ramp.

According to various embodiments, a coin processing system for processing a plurality of coins of a mixed plurality of denominations having a plurality of diameters, comprises a rotatable disc including a resilient pad coupled thereto for imparting motion to the plurality of coins, the resilient pad being generally circular and including an outer peripheral edge, and a stationary sorting head. The stationary sorting head includes a lower surface generally parallel to and spaced a distance from the resilient pad, the lower surface forming a coin path for directing movement of each of the plurality of coins, and a queuing area of the coin path that receives the plurality of coins from the stripping area, the queuing area including a snubbing edge curving tangentially with the outer peripheral edge of the resilient pad to guide the coins in a single file configuration to a discrimination area.

In certain embodiments, the snubbing edge is a beveled surface.

In certain embodiments, the beveled surface extends over the rotatable disc.

In certain embodiments, the beveled surface is beveled to a zero depth just inboard of a perimeter of the rotatable disc.

certain embodiments, the queuing area includes a first rail that forms an outer edge of a top surface of the queuing area and a second rail that forms an outer edge of the snubbing edge.

In certain embodiments, the snubbing edge transitions downward from the first rail to the second rail.

According to various embodiments, a coin processing system for processing a plurality of coins of a mixed plurality of denominations having a plurality of diameters, comprises a rotatable disc including a resilient pad coupled thereto for imparting motion to the plurality of coins, the resilient pad being generally circular and including an outer peripheral edge, and a stationary sorting head. The stationary sorting head includes a lower surface generally parallel to and spaced a distance from the resilient pad, the lower surface forming a coin path for directing movement of each of the plurality of coins, a stripping area of the coin path including at least one stripping surface operable to retain at least one coin when overlapping another coin such that the other coin is separated from the at least one coin by the motion imparted by the rotatable disc, and a queuing area of the coin path that receives the plurality of coins from the stripping area, the queuing area including a beveled surface curving tangentially with the outer peripheral edge of the resilient pad to guide the coins in a single file configuration to a discrimination area.

In certain embodiments, the stripping area includes a first stripping ramp located at an initial edge of the stripping area and structured with an angle from the lower surface in a first direction that is tangential to a rotation of the rotatable disc.

In certain embodiments, the angle of the first stripping ramp increases in a second direction that is a radial direction of the rotatable disc.

In certain embodiments, an increase in the angle of the first stripping ramp is constant across the stripping area in the second direction.

In certain embodiments, the coin processing system further includes a second stripping ramp located in the second direction, towards a center of the rotatable disc, from the first stripping ramp.

In certain embodiments, the second stripping ramp is located in a counterclockwise direction in the first direction.

In certain embodiments, an angle of the second stripping ramp increases in the second direction.

In certain embodiments, an increase in the angle of the second stripping ramp is less than the increase of the angle of the first stripping ramp.

In certain embodiments, the angle of the second stripping ramp is constant across the stripping area in the second direction and the angle of the second stripping ramp is different from the angle of the first stripping ramp.

According to various embodiments, a coin processing system for processing a plurality of coins of a mixed plurality of denominations having a plurality of diameters, comprises a rotatable disc including a resilient pad coupled thereto for imparting motion to the plurality of coins, the resilient pad being generally circular and including an outer peripheral edge, and a stationary sorting head. The stationary sorting head includes a lower surface generally parallel to and spaced a distance from the resilient pad, the lower surface forming a coin path for directing movement of each of the plurality of coins, and a queuing area of the coin path that receives the plurality of coins from the stripping area, the queuing area including a snubbing edge curving tangentially with the outer peripheral edge of the resilient pad to guide the coins in a single file configuration to a discrimination area.

In certain embodiments, the snubbing edge is a beveled surface.

In certain embodiments, the beveled surface extends over the rotatable disc.

In certain embodiments, the beveled surface is beveled to a zero depth just inboard of a perimeter of the rotatable disc.

In certain embodiments, the queuing area includes a first rail that forms an outer edge of a top surface of the queuing area and a second rail that forms an outer edge of the snubbing edge.

In certain embodiments, the snubbing edge transitions downward from the first rail to the second rail.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication or interaction between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of non-volatile/memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 7B, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

As used throughout this specification, the terms currency denomination, denomination of currency, valuable document, currency bill, bill, banknote, note, bank check, paper money, paper currency, coin, coinage, and cash may be used interchangeably herein to refer to a type of a negotiable instrument or any other writing that evidences a right to the payment of a monetary obligation, typically issued by a central banking authority. Payment acceptor and coin acceptor may be used interchangeably herein to refer to a type of monetary acceptor unit that may verify inserted banknote in a banknote acceptor or coin in coin acceptor. Payment acceptor may comprise both a banknote acceptor and coin acceptor and other electronic payment acceptance devices. Payment acceptor may include either of a banknote acceptor or a coin acceptor; payment acceptor may or may not comprise electronic payment acceptance devices.

The stripping edge and the snubbing edge improve throughput of coins through the system. The stripping edge improves coin flow by creating a single file, single layer of coins in an inner island area. The stripping edge separates coins from a stack and reduces the burden of addressing stacked coins on downstream stripping features. The snubbing edge in the queuing channel area pushes coins into the coin pad and ensures tight grip on the coins before moving to sensors. The snubbing area functions to initiate an increased press of the coin into the pad as the coins begin to extend beyond the coin pad perimeter. This increased press ensures that the coins are driven against the inner queuing wall and resist the effects of centrifugal force. Because of snubbing edge movement of a coin in a vertical plane is restricted, the measurement performance of sensors is improved. In addition, the snubbing edge reduces coin impact on an outer edge of the coin sorting disk, which this results in less wear and tear on the coin sorting disc and the coin pad. Both the stripping and the snubbing edges, individually or in combination, allow turn table to rotate at a lower rpm while maintaining a same coin throughput by, first, improving coin separation to get single file single layer coins in inner island area and, second, improving grip on coin by reducing error in measurement. Processed coins by the OEM engine at high throughput and a lower rpm for rotating the turn table reduces wear and tear on all parts of the OEM engine, which helps reduce service cost of maintain machine in field.

Figure 1A:
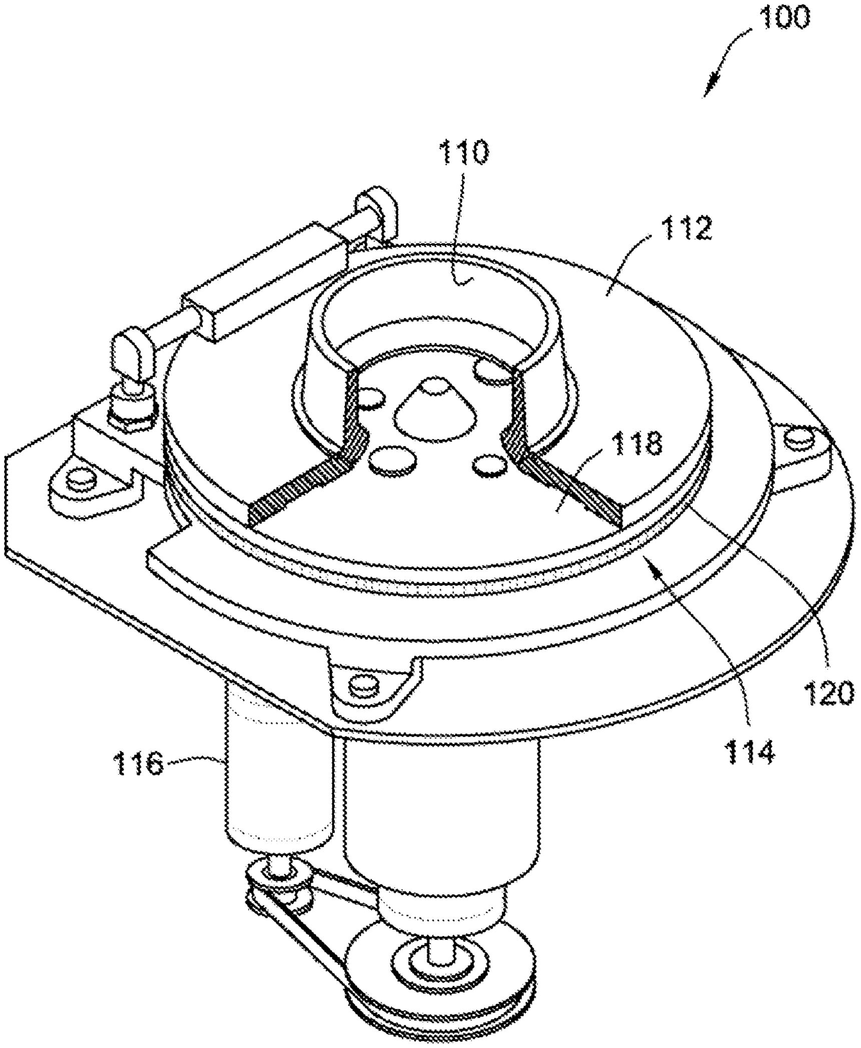
FIG. 1A illustrates a perspective view of a disc-type coin processing system or coin sorter in accordance with to various embodiments of this disclosure.

FIG. 1A illustrates a perspective view of a disc-type coin processing system 100 or coin sorter in accordance with various embodiments of this disclosure. The coin processing system 100 includes a hopper 110 for receiving coins of mixed denominations that feeds the coins through a central opening in an annular sorting head 112. As the coins pass through this opening, they are deposited on the top surface of a rotatable disc 114. This rotatable disc 114 is mounted for rotation on a shaft (not shown) and driven by an electric motor 116. The disc 114 typically comprises a resilient pad 118, preferably made of a resilient rubber or polymeric material, bonded to the top surface of a solid disc 120. While the solid disc 120 is often made of metal, it can also be made of a rigid polymeric material.

According to some embodiments, coins are initially deposited by a user or operator in a coin tray (not shown) disposed above the coin processing system 100 shown in FIG. 1A. The user lifts the coin tray which funnels the coins into the hopper 110. A coin tray suitable for use in connection with the coin processing system 100 is described in detail in U.S. Pat. No. 4,964,495 entitled "Pivoting Tray For Coin Sorter," which is incorporated herein by reference in its entirety.

As the disc 114 is rotated, the coins deposited on the resilient pad 118 tend to slide outwardly over the surface of the pad 118 due to centrifugal force. As the coins move outwardly, those coins which are lying flat on the pad 118 enter the gap between the surface of the pad 118 and the sorting head 112 because the underside of the inner periphery of the sorting head 112 is spaced above the pad 118 by a distance which is about the same as the thickness of the thickest coin the coin processing system 100 is designed to sort. As is further described below, the coins are processed and sent to exit stations or channels where they are discharged. The coin exit stations or channels may sort the coins into their respective denominations and discharge the coins from the sorting head 112 corresponding to their denominations. In some embodiments, the sorting head 112 and rotatable disc 114 of this disclosure can be smaller in diameter than previous systems, such as 9¾ inches in diameter, whereas previous systems may have included an 11-inch turntable, for example.

Figure 1B:
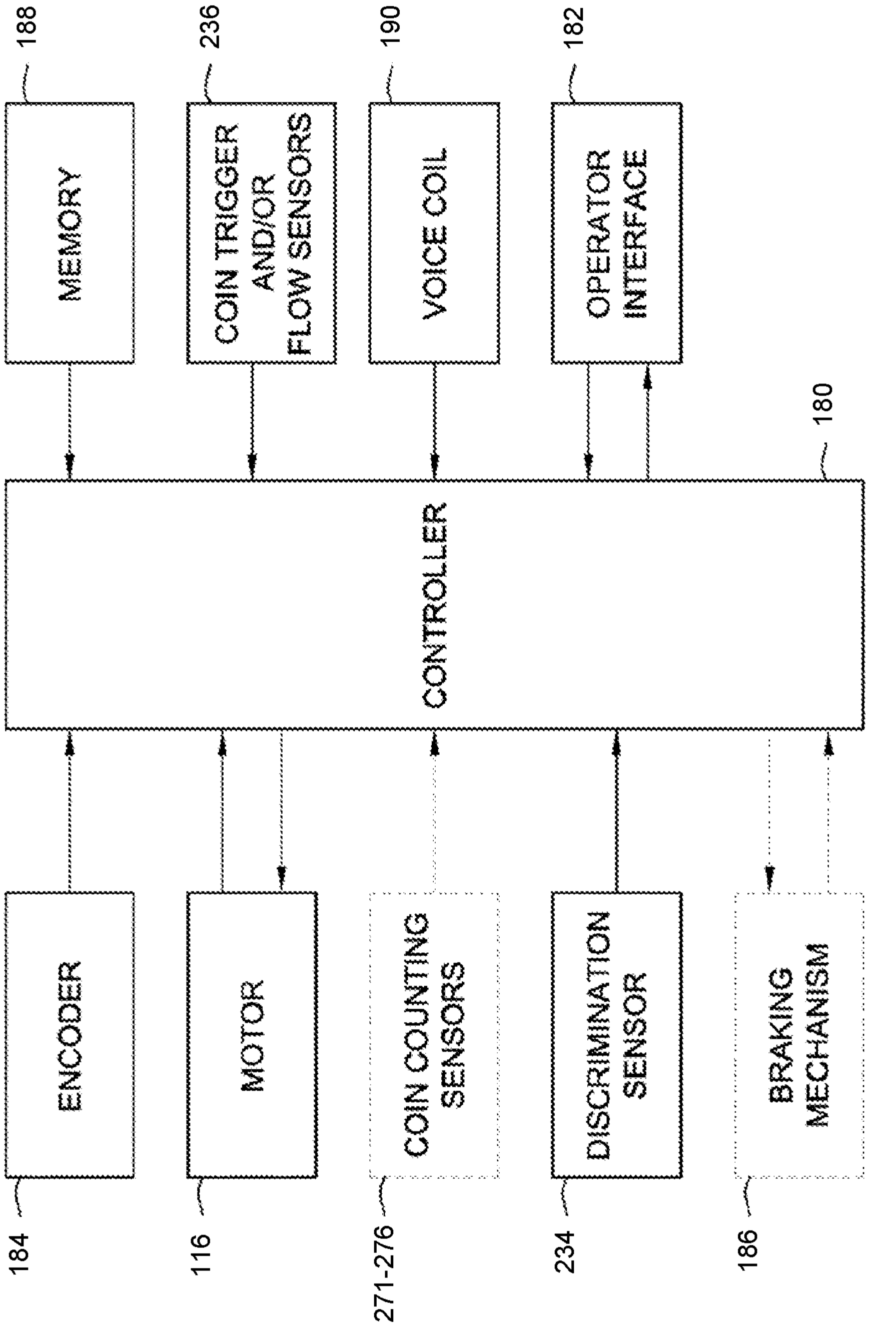
FIG. 1B illustrates a functional block diagram of a control system for a coin processing system in accordance with various embodiments of this disclosure.

FIG. 1B illustrates a functional block diagram of a control system for the coin processing system 100 shown in FIG. 1A which may be employed with the sorting heads 112 of the disc-type coin processing system 100. FIG. 1B illustrates a system controller 180 and its relationship to the other components in the coin processing system 100. More details regarding a system controller 180 and its relationship to the other components in the coin processing system 100 are described in U.S. Pat. No. 7,743,902, which is incorporated herein by reference in its entirety. An operator of system 100 communicates with the coin processing system 100 via an operator interface 182 which is configured to receive information from the operator and display information to the operator about the functions and operation of the coin processing system 100. The controller 180 monitors the angular position of the disc 114 via an encoder 184 which sends an encoder count to the controller 180 upon each incremental movement of the disc 114. Based on input from the encoder 184, the controller 180 determines the angular velocity at which the disc 114 is rotating as well as the change in angular velocity, that is, the acceleration and deceleration, of the disc 114. The encoder 184 allows the controller 180 to track the position of coins on the sorting head 112 after being sensed. According to some embodiments of the coin processing system 100, the encoder has a resolution of 40,000 pulses per revolution of the disc 114.

The controller 180 also controls the power supplied to the motor 116 which drives the rotatable disc 114. When the motor 116 is a DC motor, the controller 180 can reverse the current to the motor 116 to cause the rotatable disc 114 to decelerate. Thus, the controller 180 can control the speed of the rotatable disc 114 without the need for a braking mechanism. If a braking mechanism 186 is used, the controller 180 also controls the braking mechanism 186. Because the amount of power applied is proportional to the braking force, the controller 180 has the ability to alter the deceleration of the disc 114 by varying the power applied to the braking mechanism 186.

According to some embodiments of the coin processing system 100, the controller 180 also monitors coin counting sensors 271-276 which are disposed in each of the coin exit slots of the sorting head 112 (or just outside the periphery of the sorting head 112). As coins move past one of these counting sensors 271-276, the controller 180 receives a signal from the counting sensor 271-276 for the particular denomination of the passing coin and adds one to the counter for that particular denomination within the controller 180. The controller 180 and memory 188 maintain a counter for each denomination of coin that is to be sorted. In this way, each denomination of coin being sorted by the coin processing system 100 has a count continuously tallied and updated by the controller 180. According to some embodiments, the controller 180 is able to cause the rotatable disc 114 to quickly terminate rotation after "n" number (i.e., a predetermined number n) of coins have been discharged from an exit slot, but before the "n+1" coin has been discharged. For example, it may be necessary to stop the discharging of coins after a predetermined number of coins have been delivered to a coin receptacle, such as a coin bag, so that each bag contains a known number of coins, or to prevent a coin receptacle from becoming overfilled. Alternatively, the controller 180 can cause the system to switch between bags in embodiments having more than one coin bag corresponding to each exit slot. In some embodiments, the controller 180 and memory 188 maintain a counter for each denomination of coin that is to be sorted without the use of exit slot sensors such as by using a trigger sensor and monitoring the rotation of the pad 118 and tracking the location of the coins as they travel under and out from under the sorting heads 112.

The controller 180 also monitors the output of a coin discrimination sensor 234 and compares information received from the discrimination sensor 234 to master information stored in a memory 188 of the coin processing system 100 including information associated with known genuine coins. If the received information does not favorably compare to master information stored in the memory 188, the controller 180 sends a signal to a voice coil 190 causing a diverting pin to move to a diverting position. According to some embodiments of the coin processing system 100, as described in more detail in U.S. Pat. No. 7,743,902, after a coin moves past a trigger sensor 236 the coin discrimination sensor 234 begins sampling the coin and the controller 180 then compares the coin's signature to a library of "master" signatures associated with known genuine coins stored in the memory 188 and the controller 180 determines whether to reject a coin. After determining that a coin is invalid, the controller 180 sends a signal to activate a voice coil 190 for moving a diverting pin to a diverting position.

Figures 2, 2A, 2B, 2C, 2D, 2E:
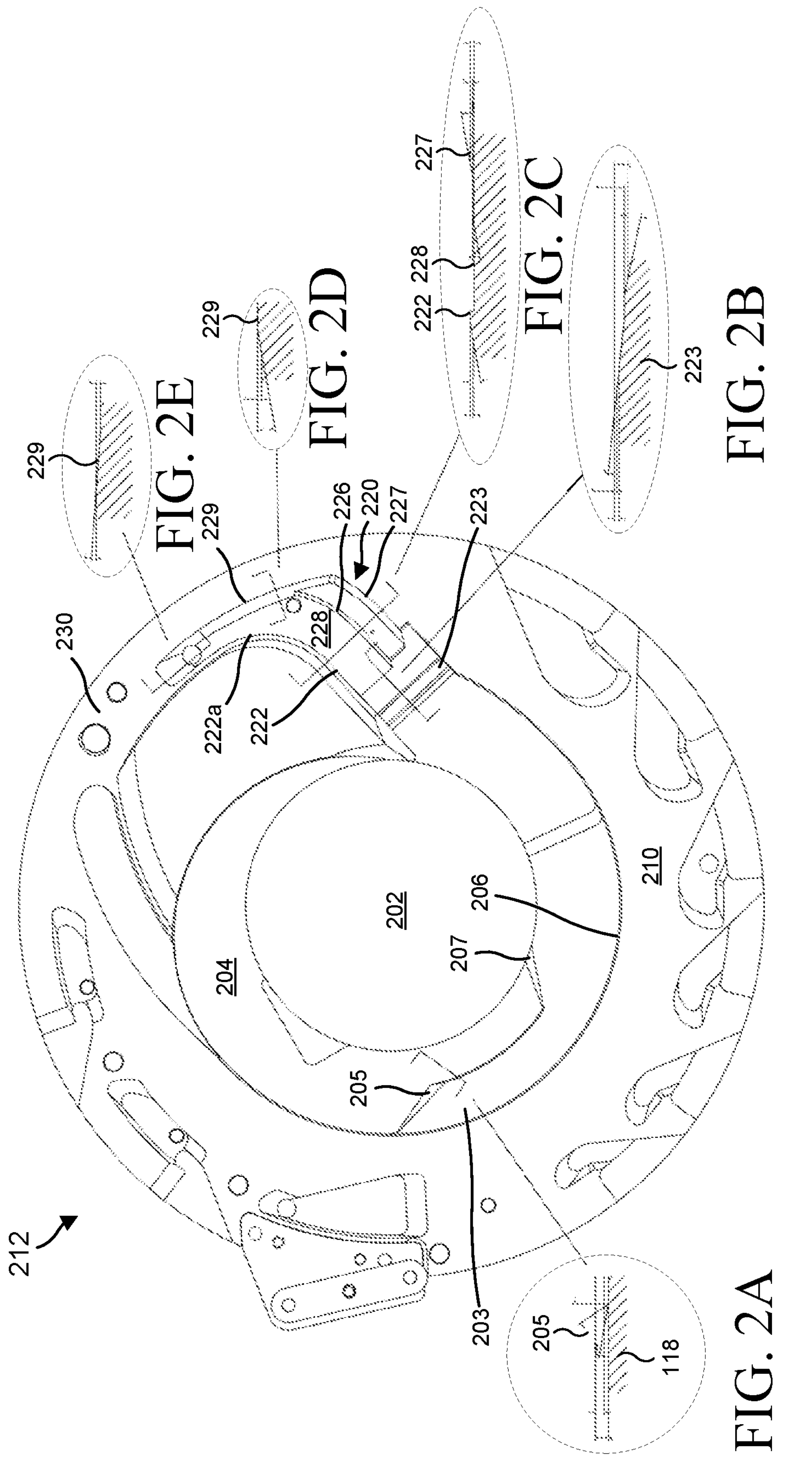
FIG. 2 illustrates a bottom plan view of a sorting head in accordance with various embodiments of this disclosure.
FIGS. 2A-2E show cross sections of angles for different components of the sorting head in accordance with various embodiments of this disclosure.

FIG. 2 illustrates a bottom plan view of a sorting head 212 in accordance with various embodiments of this disclosure. The sorting head 212 can be used with the system of FIGS. 1A and 1B. The coin sets for any given country are sorted by the sorting head 212 due to variations in the diameter size. The coins circulate between the sorting head 212 and the pad 118 (FIG. 1A) on the rotatable disc 114 (FIG. 1A). The pad 118 has a circular surface with coins being deposited on the pad 118 via a central opening 202 and initially enter an entry area 204 formed in the underside of the sorting head 212. It should be kept in mind that the circulation of the coins in FIG. 2 appears counterclockwise as FIG. 2 is a view of the underside of the sorting head 212.

An outer wall 206 of the entry area 204 divides the entry area 204 from the lowermost surface 210 of the sorting head 212. The lowermost surface 210 is preferably spaced from the pad 118 by a distance that is less than the thickness of the thinnest coins the coin sorter is designed to sort. Consequently, the initial outward radial movement of all the coins is terminated when the coins engage the outer wall 206, although the coins continue to move more circumferentially along the wall 206 (in the counterclockwise direction as viewed in FIG. 2) by the rotational movement imparted to the coins by the pad 118 of the rotatable disc 114.

In some cases, coins may be stacked on top of each other—commonly referred to as "stacked" coins or "shingled" coins. Stacked coins which are not against the wall 206 can be recirculated and stacked coins in contact against the wall 206 can be unstacked. To unstack the coins, the stacked coins encounter a first stripping surface, or ramp 205 whereby the upper coin of the stacked coins engages the first stripping ramp 205. In some embodiments, the first stripping ramp 205 gradually transitions from a high angle 205*a* near the wall 206 to a lower angle 205*b* towards central opening 202. When the upper coin engages the first stripping ramp 205, the upper coin is restrained as the lower coin continues to be pulled around wall 206 via movement of the pad 118, causing the upper coin to fall behind the lower coin to position the coins in a single file and single layer. In some embodiments, a second stripping ramp 207 is included further downstream from the first stripping ramp 205. For example, if a stacked upper coin, at the first stripping ramp 205 happens to travel along the first stripping ramp 205 such that it continues downstream from the first stripping ramp 205, the second stripping ramp 207 can contact and maintain the upper coin to strip the upper coin from the lower coin. As another example, if three coins are stacked and the lowest coin is separated from the stack to continue downstream at the first stripping ramp 205, but the two upper coins remain stacked and happen to continue downstream still stacked from the first stripping ramp 205, the second stripping ramp 207 can then separate these two upper coins.

Figure 3A:
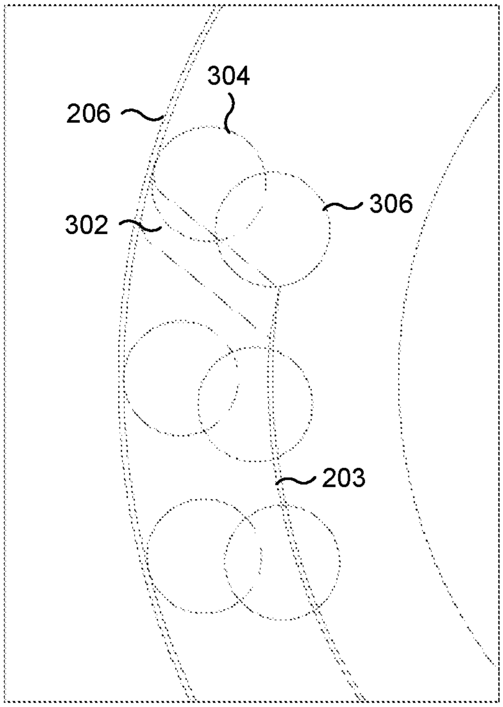
FIG. 3A illustrates an enlarged view of an example low angled stripping ramp.
Figure 3B:
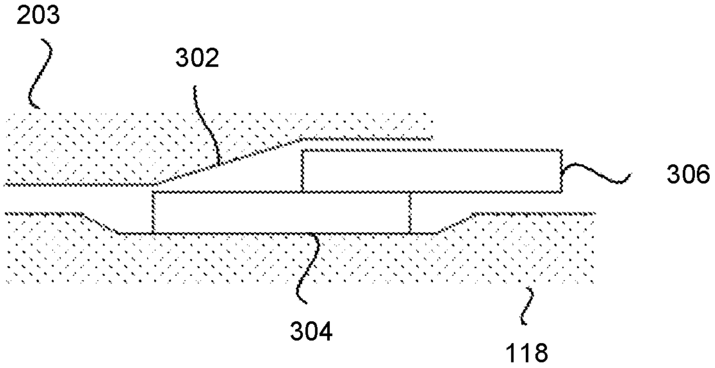
FIG. 3B illustrates a cross sectional view of an example low angled stripping ramp.

FIGS. 3A and 3B illustrate various views of an example low angled stripping ramp 302. FIG. 3A illustrates an enlarged view of the example low angled stripping ramp 302. FIG. 3B illustrates a cross sectional view of the example low angled stripping ramp 302. Previous disc-type coin processing systems employed sorting heads having only one low angled stripping ramp 302. Such low angled stripping ramps can be ineffective in separating shingled or stacked coins 306. As shown in FIG. 3B, instead of the low angled stripping ramp 302 maintaining an upper coin 306, stacked coins encountering the low angled stripping ramp 302 can instead be driven into the pad 118, allowing the upper coin 306 to slip past the low angled stripping ramp 302, as shown in FIG. 3A, to remain at least partially stacked or shingled with the lower coin 304. Such a low angled stripping ramp 302 would therefore allow for stacked or shingled coins to enter the queuing channel 220, which can cause issues with further coin discrimination and sorting, or can require that coins be passed back through opening 202 to be recirculated, decreasing efficiency and coin throughput.

Figure 4A:
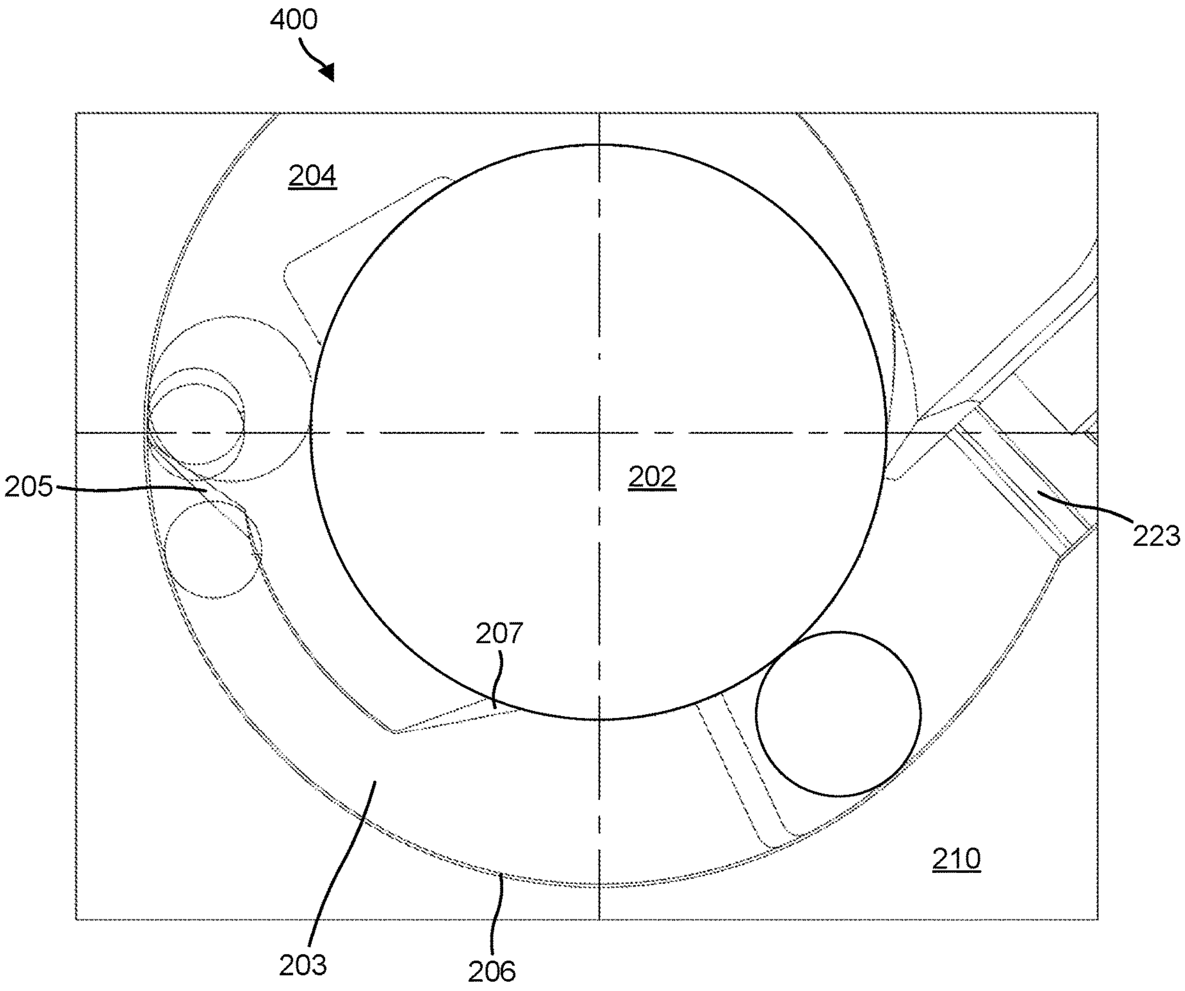
FIG. 4A illustrates an enlarged bottom plan view of a stripping area of a sorting head in accordance with various embodiments of this disclosure.
Figure 4B:
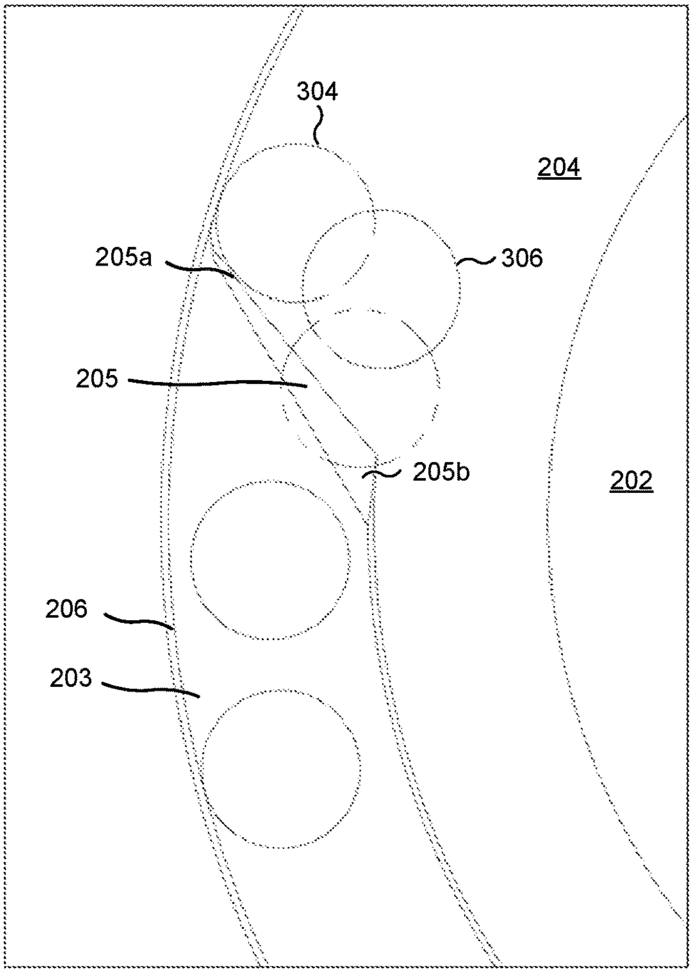
FIG. 4B illustrates an enlarged view of a stripping ramp in accordance with various embodiments of this disclosure.
Figure 4C:
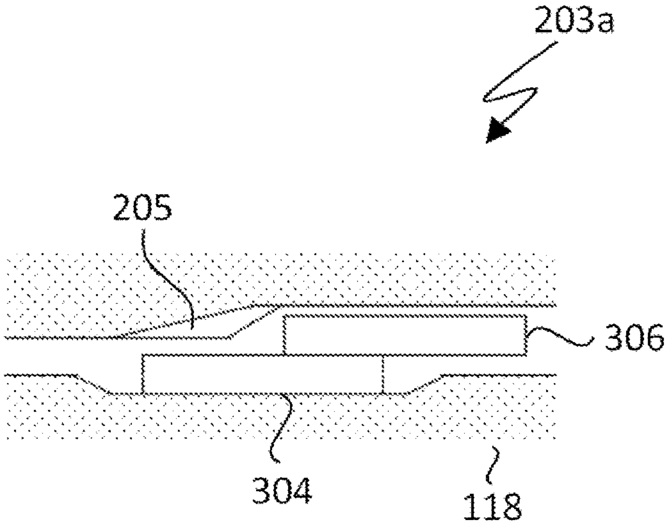
FIG. 4C illustrates a cross sectional view of a stripping ramp in accordance with various embodiments of this disclosure.

FIGS. 4A-4C illustrate various views of a coin stripping area 400 of a sorting head, such as sorting head 212, in accordance with various embodiments of this disclosure. FIG. 4A illustrates an enlarged bottom plan view of the stripping area 400 of the sorting head 212. FIG. 4B illustrates an enlarged view of a first stripping ramp 205. FIG. 4C illustrates a cross sectional view of the first stripping ramp 205. As shown in FIGS. 4A-4C, and as also described with respect to FIG. 2, the first stripping ramp 205 maintains the upper coin in a stack such that the lower coin can pass and continue downstream of the entry area 204 while the upper coin is held back. For example, as shown in FIG. 4A, when a coin stack including a larger diameter coin on a bottom of the stack and an upper smaller diameter coin reaches the first stripping ramp 205, the upper smaller diameter coin contacts the first stripping ramp 205 and is separated from the larger diameter coin. The larger diameter coin is free to continue along wall 206, while the smaller diameter coin falls behind the larger diameter coin and travels along wall 206 behind the larger diameter coin. As another example, when two coins of the same diameter are stacked, such as the two smaller diameter coins illustrated in FIG. 4A, the first stripping ramp 205 can cause the upper smaller diameter coin to be separated from the other smaller diameter coin, or, if the smaller diameter coins remain stacked, the second stripping ramp 207 can separate the two smaller diameter coins.

As shown in FIG. 4B, the stripping area 400 can include a first stripping ramp 205 at an initial edge of the stripping area 400. The initial edge is an edge of the stripping area 400 that the coin will pass first. The first stripping ramp 205 gradually transitions from a high angle 205*a* near the wall 206 to a lower angle 205*b* towards central opening 202. The angle of the first stripping ramp 205 is in relation to a tangent of the rotation of the pad 118 and from the surface of the stripping area facing the pad 118. When described as “high” and “low” angles, the angle is defined from a plane of the stripping area facing the pad 118 in a direction that is tangential to the rotation of the pad 118.

The gradual transition can be a constant or variable transition between the high angle 205*a* to the low angle transition. A gradual transition provides more flexibility between different types of currency. The first stripping ramp 205 having a constant transition would allow for more consistency in manufacturing the sorting head 212. A variable transition for the first stripping ramp 205 can provide a greater accuracy of sorting coins of a specific currency. With a finite number of coins in a currency, the thicknesses for stacked coins can be determined and the gradual transition of the first stripping ramp 205 can have a variable slope or multiple angles.

The gradual transition causes larger or thicker coins to move along the first stripping ramp 205 and to pass the first stripping ramp 205 at the lower angled portion of the first stripping ramp 205, providing time for lower coins to be separated and passed through the first stripping ramp 205. As shown in FIG. 4C, an upper coin restrained on the first stripping ramp 205 is held in place while the pad continues to turn, pulling the lower coin ahead and out from under the restrained upper coin. It will be understood that second stripping ramp 207 can operate in a similar manner. For instance, the first stripping ramp 205 and the second stripping ramp 207 can have the same change in angle between the high angle side and the low angle side. The first stripping ramp 205 and the second stripping ramp 207 could also have different configurations for the gradual transition. For instance, if a currency has a specific stacked coin combination or combinations that present more issues than other stacked coin combinations, the first stripping ramp 205 have the gradual transition of the first stripping ramp 205 angled based on accommodating the specific stacked coin combination and the second stripping ramp 207 could have a different transition.

The function of the island 203 is to manage flow of the predominant thin coins, for example 1¢, 10¢, or 25¢ coins. Such coins can range in thickness from 0.053" to 0.067". In some embodiments, the depth of this area is approximately 0.070", providing a lowered ceiling from previous systems, which works to settle coin flutter and helps better maintain coin contact with the top surface of the coin pad, which drives coin through the path to sorting. The island 203 can include one or more stripping ramps. FIG. 2A shows a cross section of an angle for the first stripping ramp 205 and the pad 118. As stacked coins arrive at the stripping ramps 205 or 207, the stripping ramps 205 or 207 are restrictive enough to stall the forward motion of the upper coin while the surface friction of the coin pad 118 drives the lower coin out from underneath, separating the pair. Similarly, when a single, thicker coin, such as 5¢, 50¢, or $1 coins, engage the same stripping ramps 205 or 207, the high surface friction of the coin pad 118 drives the coin into, and under, the edge.

This presses the thicker coin downward, into the coin pad 118, rotating the coin concentrically until it arrives at an area of sufficient depth that it is released from pad pressure and again allowed to become affected by centrifugal force. In some embodiments, the stripping ramps 205 or 207 can be tailoring to the sizes of an expected specific coin set, so that stacked coins will be efficiently separated at a high percentage while allowing non-stacked coin to pass through the system with relative ease.

The more efficient stripping of coins by the sorting head 212 of the present disclosure can also allow for the system to operate at slower speeds than previous disc-type coin sorting systems because the higher coin stripping efficiency allows for no coins, or less coins, to have to be passed back through the opening 202 and recirculated. This allows for slower speeds of the coin processing system of the various embodiments of this disclosure to provide for similar coin throughput than previous coin processing systems operating at higher speeds, since the previous systems will be recirculating more coins that are failed to be stripped. Operating at slower speeds can increase the longevity of the system, and results in less maintenance of the system.

Referring again to FIG. 2, as the pad 118 continues to rotate, and after the coins pass the stripping area of the sorting head 212 that includes the stripping ramps 205 or 207, the coins aligned along the wall 206 pass over a ramp 223 leading into a queuing channel 220 for aligning the innermost edge of each coin along the inner queuing wall 222. FIGS. 2B-2E show cross sections of angles for different components of the queuing channel. In addition to the inner queuing wall 222, the queuing channel 220 includes a beveled surface or snubbing edge 229, which, in some embodiments, includes a first rail 226 that forms the outer edge of surface 228 and a second rail 227 that forms the outer edge of snubbing edge 229. The snubbing edge 229 transitions downward from first rail 226 to second rail 227. In some embodiments, the surfaces 228 and 229 are sized such that the combined width of surfaces 228 and 229 is less than that of the smallest (in terms of the diameter) coin. As a result, because surfaces 228 and 229 have a combined width less than that of the smallest diameter coin the sorting head 212 is configured to sort, each coin has a portion thereof which extends beyond the outer periphery 118*a* of the rotating pad 118 as they enter a discrimination region 230.

The coins are gripped between one of the two rails 226, 227 and the pad 118 as the coins are rotated through the queuing channel 220. The coins, which were initially aligned with the outer wall 206 of the island 203 as the coins moved across the ramp 223 and into the queuing channel 220, are rotated into engagement with inner queuing wall 222. Because the queuing channel 220 applies a greater amount of pressure on the outside edges of the coins, the coins are less likely to bounce off the inner queuing wall 222 as the radial position of the coin is increased along the inner queuing wall 222.

The queuing channel 220 provides a multitude of functions affecting the flow of coins ahead of discrimination and sorting operations that occur downstream from the queuing channel 220. As described herein, the sorting head 212 attempts to keep an arrangement of the coin stream in a single file, single layer, arrangement, aligned to a common inner edge. To accomplish this, the depth of the queuing channel 220 is maintained less than the thickness of the thinnest coin. This depth, such as approximately 0.030" for U.S. coins, puts all coin under pad pressure from the channel entry to the channel end. In previous disc-type sorting systems, this channel configuration was comprised of parallel walls throughout the entire channel length. However, the queuing channel of previous disc-type coin sorting systems extended beyond a perimeter of the coin pad, which would cause coins to be guided within the channel such that the coins would overhang the perimeter of the pad. Such a configuration resulted in less pad control, support, and pad pressure on the coins. This causes coins to become more susceptible to the effects of centrifugal force, especially at the increased radius and linear speed toward the outer channel end, and thus allowed for the potential for coins to be prematurely expelled from the disc ahead of, or near, the end of the channel.

Figure 5A:
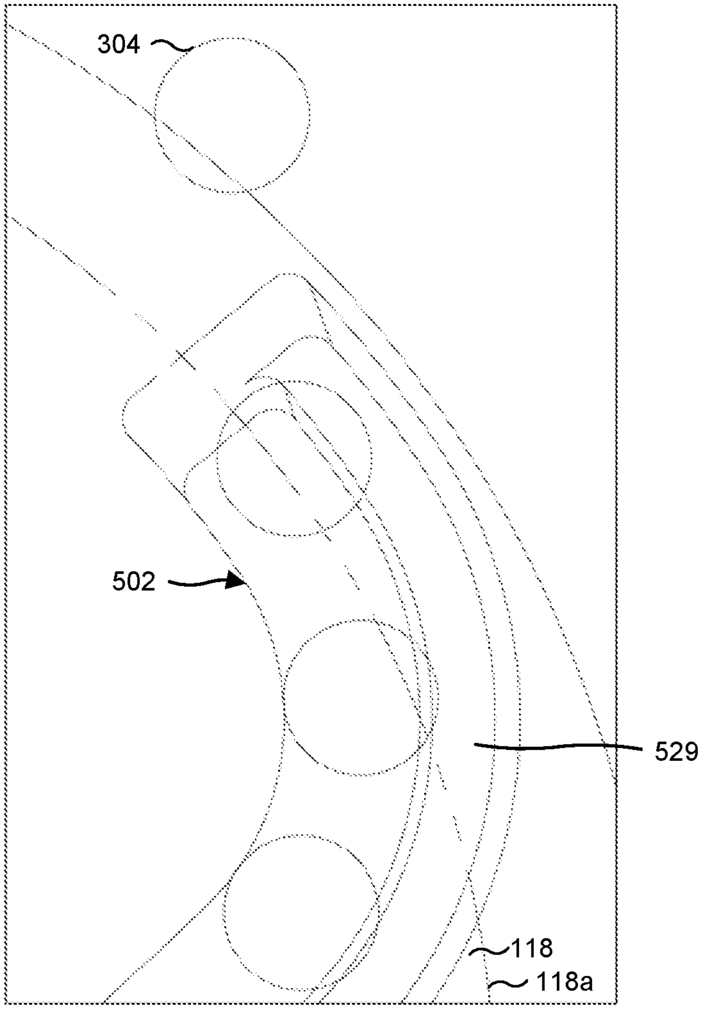
FIG. 5A illustrates an enlarged view of an example wide queuing channel.
Figure 5B:
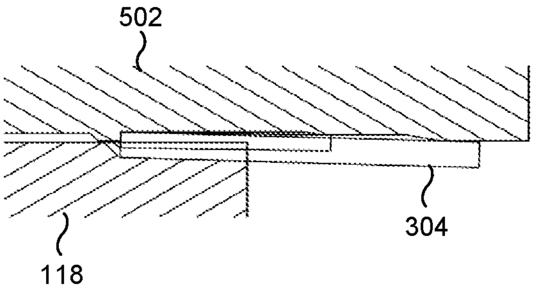
FIG. 5B illustrates a cross sectional view of an example wide queuing channel.

FIGS. 5A and 5B illustrate various views of an example wide queuing channel 502. FIG. 5A illustrates an enlarged view of the example wide queuing channel 502. FIG. 5B illustrates a cross sectional view of the example wide queuing channel 502. FIGS. 5A and 5B show that previous disc-type sorting system sorting heads including a wide queuing path with a surface 529 that extends beyond the perimeter of the outer edge of the pad 118 as the queuing path 502 curves. Such a configuration results in less pad control, support, and pad pressure on the coins. This causes coins to become more susceptible to the effects of centrifugal force, especially at the increased radius and linear speed toward an outer end of the channel 502, and thus allows for the potential for coins to be prematurely expelled from the disc 114 ahead of, or near, the end of the queuing channel 502.

Figure 6A:
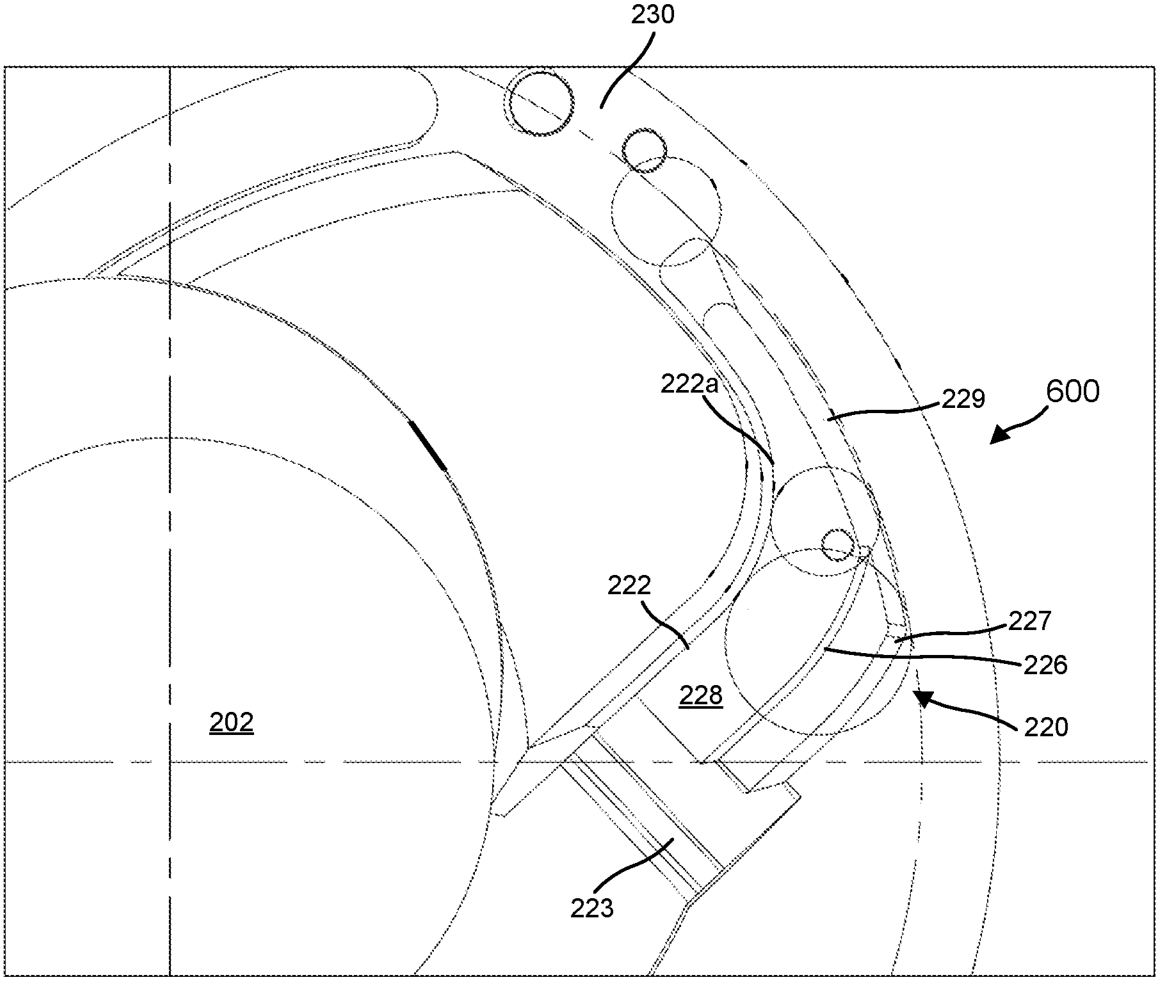
FIG. 6A illustrates a bottom plan view of a queuing channel area of a sorting head in accordance with various embodiments of this disclosure.
Figure 6B:
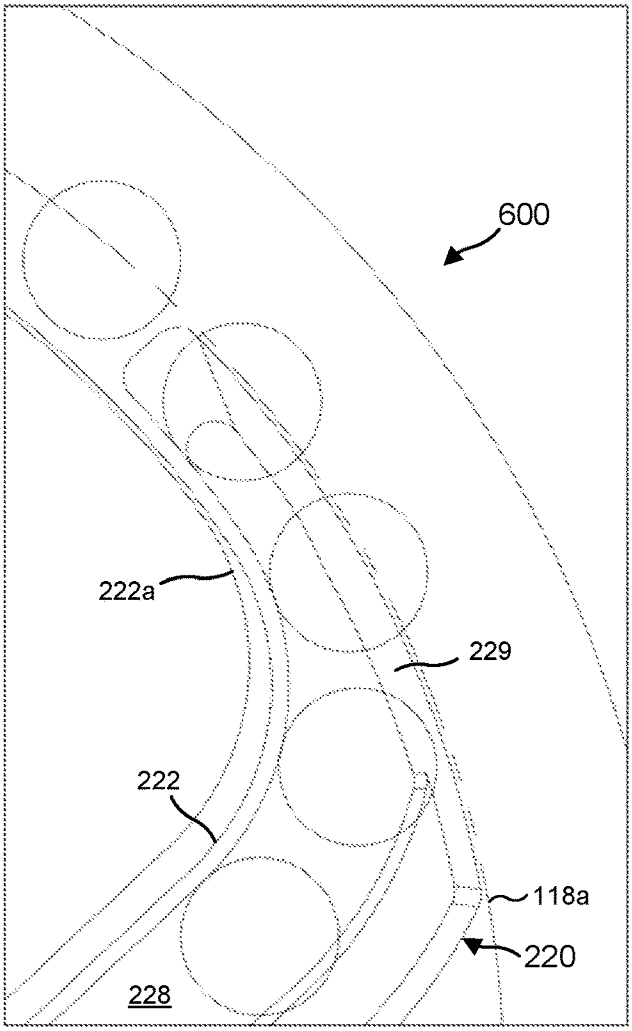
FIG. 6B illustrates an enlarged view of a queuing channel area in accordance with various embodiments of this disclosure.
Figure 6C:
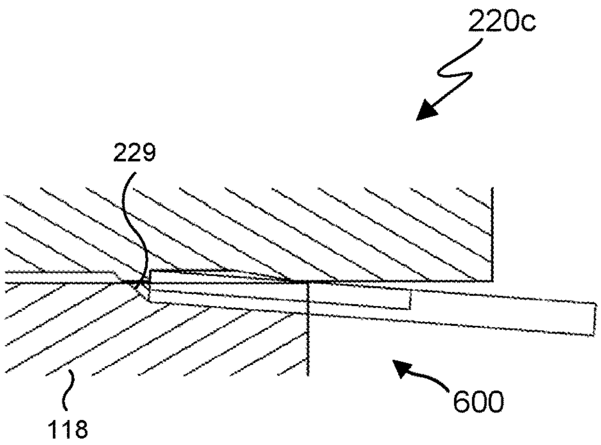
FIG. 6C illustrates a cross sectional view of a queuing channel area in accordance with various embodiments of this disclosure.

FIGS. 6A-6C illustrate various views of a queuing channel area 600 of a sorting head, such as sorting head 212, in accordance with various embodiments of this disclosure. FIG. 6A illustrates a bottom plan view of the queuing channel area 600 of the sorting head 212. FIG. 6B illustrates an enlarged view of the queuing channel area 600. FIG. 6C illustrates a cross sectional view of the queuing channel area 600. To alleviate the conditions described with respect to FIGS. 5A and 5B, as shown in FIGS. 6A and 6B, the queuing channel area 600 includes a snubbing edge 229 that closes down the end of the channel 220. The snubbing edge 229 is beveled to a zero depth just inboard of the pad perimeter, such that the snubbing edge 229 runs substantially parallel to a perimeter of the pad 118 or tangentially to a perimeter of the pad 118, unlike the wide queuing channel 502 of FIGS. 5A and 5B, which extends beyond the perimeter of the pad 118. The bevel of the snubbing edge 229 can extend from a perimeter of the pad 118 across the queuing channel area 600 or have a sharp angle at the perimeter of the pad 118. As the coin goes into the snubbing edge 229, the coin is tilted providing a greater amount of force on the coin into the pad 118.

As shown in FIG. 6C, the snubbing edge 229 intercepts a coin along its outer path and presses it fully into the surface of the pad 118. This pressing action greatly increases the grip of the pad 118 on the coin along the outer portion of the channel path, ensuring that the coin is driven concentrically against the inner channel edge and significantly reduces the chances of a coin being prematurely expelled. The snubbing edge 229 guides the coin to an end of the queuing channel area 600 and presents the coin to a discrimination region 230 of the sorting head 212 in a single file, single layer, configuration aligned to a common inner edge.

Figure 7A:
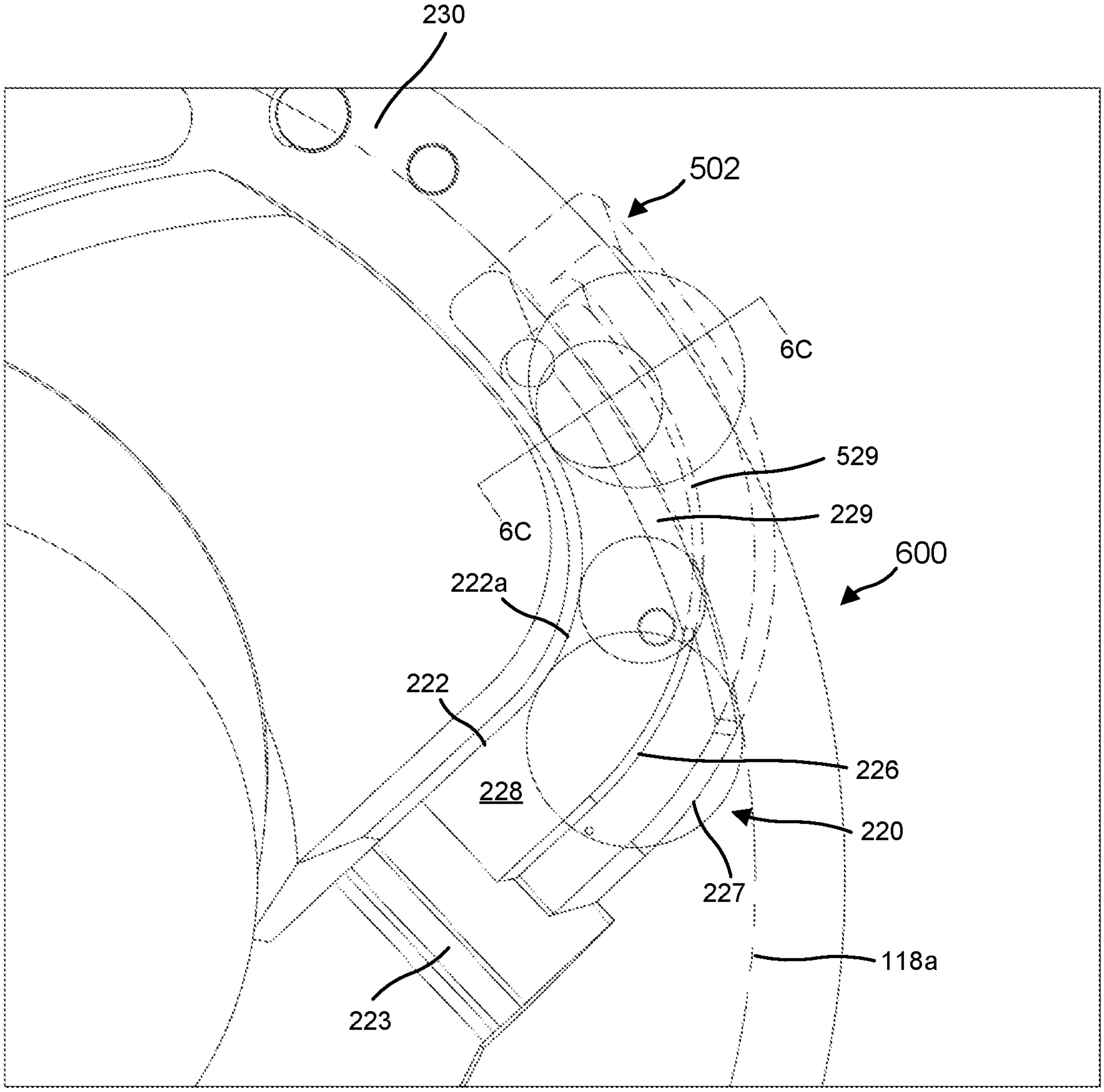
FIG. 7A illustrates a bottom plan view of a queuing channel in accordance with various embodiments of this disclosure with an overlaid previous queuing channel.
Figure 7B:
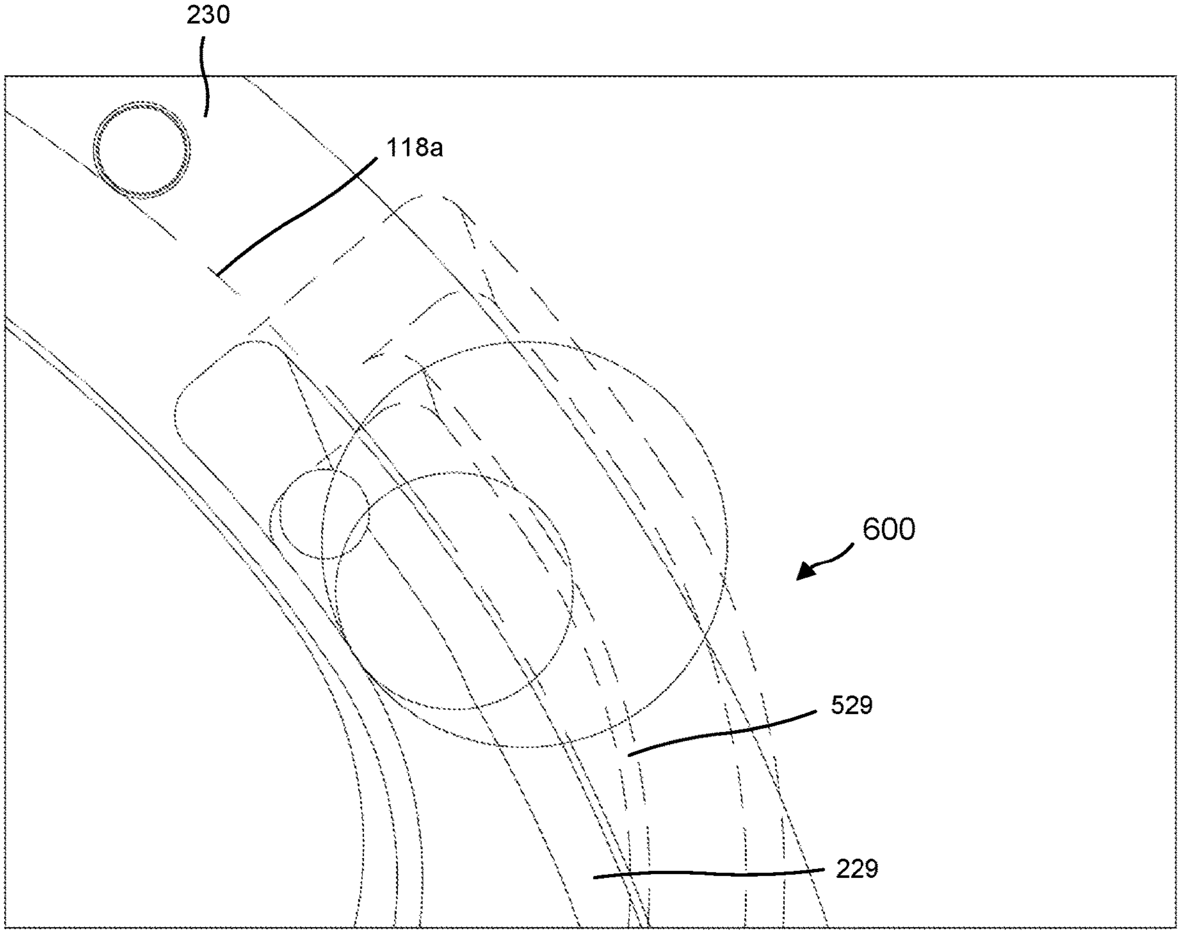
FIG. 7B illustrates an enlarged view of a queuing channel in accordance with various embodiments of this disclosure with an overlaid previous queuing channel.

FIG. 7A illustrates a bottom plan view and 7B illustrates an enlarged view of the queuing channel area 600 with the previous queuing channel 502 overlaid on the queuing channel area 600 to show the differences in configuration. A significant benefit of the queuing channel area 600 configuration is that it allows for an increased gap to exist between the coin pad 118 and the sorting disc 112, while still maintaining a high degree of control over coin flow. The channel 502 includes a surface 529 that extends beyond the perimeter of the pad and requires a smaller gap to maintain coin control. Even with a smaller gap, the channel 502 can prematurely expel coins due to the speed and centrifugal force applied to the coins. The queuing channel area 600 being able to have a larger gap between the coin pad and the sorting disc is beneficial because an increased disc-to-pad gap may occur for a variety of reasons, such as variable coin pad flatness during manufacturing, variability of adjustments by service personnel, variability of surface contour caused by coin wear, and variability caused by a thick coin adjacent to a thin coin. The configuration of the queuing channel area 600 provides for significantly improved coin control at increased gap ranges not achievable with previous disc-type sorting devices.

As also described in U.S. Pat. No. 10,181,234, incorporated by reference herein in its entirety, as the pad 118 continues to rotate, the coins move along the queuing channel 220 and are still engaged on the inner queuing wall 222. The coins move out of the queuing channel 220 to be further processed in a discrimination region. The discrimination region can include a discrimination sensor 234 for discriminating between valid and invalid coins and/or identifying the denomination of coins. As the pad 118 continues to rotate, the shape of the queuing channel 220 imparts spacing to the coins which are initially closely spaced, and perhaps abutting one another, as the coins move across the ramp 223 into the queuing channel 220. As the coins move along the queuing channel 220 upstream of corner 222*a*, the coins are pushed against inner queuing wall 222 and travel along the inner queuing wall 222 in a direction that is transverse to (i.e., generally unparallel) the direction in which the pad 118 is rotating. This action aligns the coins against the inner queuing wall 222. As the coins round the corner 222*a* of the queuing channel 220, the coins follow the direction of the pad (i.e., in a direction more parallel to the direction of movement of the pad). A coin rounding the corner 222*a* is accelerated as the coin moves in a direction with the pad; thus, the coin is spaced from the next coin upstream. Accordingly, the coins moving out of the queuing channel 220 are spaced apart. According to some embodiments of the present disclosure, the coins are spaced apart by at least about 10 mm or 0.40 inches when the sorting head 212 has an eleven inch diameter and the pad 118 rotates at a speed of approximately three hundred revolutions per minute (300 rpm) such as at approximately 320 rpm.

As also described in U.S. Pat. No. 10,181,234, incorporated by reference herein in its entirety, the coin trigger sensor 236 can be disposed just upstream of the discrimination sensor 234 for detecting the presence of a coin. Coins first move over the coin trigger sensor 236 (e.g., a photo detector or a metal proximity detector) which sends a signal to a controller (e.g., controller 180) indicating that a coin is approaching the coin discrimination sensor 234. According to some embodiments, the sensor is an optical sensor which may employ a laser to measure a chord of passing coins and/or the length of time it takes the coin to traverse the sensor and this information along with the information from the coin discrimination sensor 234 is used to determine the diameter, denomination, and validity of a passing coin.

Downstream of the discrimination sensor 234 is a diverting pin disposed adjacent inner alignment wall that is movable to a diverting position (out of the page as viewed in FIG. 2) and a home position (into the page as viewed in FIG. 2). In the diverting position, the diverting pin directs coins off of inner alignment wall and into a reject slot. The reject slot can include a reject surface and a reject wall that rejected coins abut against as they are off-sorted to the periphery of the sorting head 212. Off-sorted coins are directed to a reject area (not shown). Coins that are not rejected (i.e., valid coins) eventually engage an outer wall of a gauging channel or region where coins are aligned on a common outer radius for entry into a coin exit station or exit slot area.

As the pad 118 continues to rotate, coins not diverted into the reject slot continue to the gauging region. The radial position of the coins is maintained, because the coins remain under pad pressure, until the coins contact an outer wall of the gauging region. According to some embodiments, the sorting head 212 includes a gauging block which has an outer wall extending beyond the outer periphery of the rotating pad 118.

The exit slots can be dedicated to differently sized coins. For example, the first exit slot can be dedicated to the smallest diameter coin to be sorted (e.g., the dime in the U.S. coin set). Beyond the first exit slot, the sorting head 212 shown in FIG. 2 forms five more exit slots which discharge coins of different denominations at different circumferential locations around the periphery of the sorting head 212. Thus, the exit slots are spaced circumferentially around the outer periphery of the sorting head 212 with the innermost edges of successive channels located progressively closer to the center of the sorting head 212 so that coins are discharged in the order of increasing diameter. The number of exit slots can vary according to alternative embodiments.

The innermost edges of the exit slots are positioned so that the inner edge of a coin of only one particular denomination can enter each channel. The coins of all other denominations reaching a given exit slot extend inwardly beyond the innermost edge of that particular exit slot so that those coins cannot enter the channel and, therefore, continue on to the next exit slot under the circumferential movement imparted on them by the pad 118. To maintain a constant radial position of the coins, the pad 118 continues to exert pressure on the coins as they move between successive exit slots.

According to some embodiments of the sorting head 212, each of the exit slots includes a coin counting sensor 271-276 for counting the coins as coins pass through and are discharged from the coin exit slots. In embodiments of the coin processing system utilizing a discrimination sensor 234 capable of determining the denomination of each of the coins, it is not necessary to use the coin counting sensors 271-276 because the discrimination sensor 234 provides a signal that allows the controller 180 to determine the denomination of each of the coins. Through the use of the system controller 180 (FIG. 1B), a count is maintained of the number of coins discharged by each of the exit slots.

According to various embodiments, a coin processing system for processing a plurality of coins of a mixed plurality of denominations having a plurality of diameters, comprises a rotatable disc including a resilient pad coupled thereto for imparting motion to the plurality of coins, the resilient pad being generally circular and including an outer peripheral edge, and a stationary sorting head. The stationary sorting head includes a lower surface generally parallel to and spaced a distance from the resilient pad, the lower surface forming a coin path for directing movement of each of the plurality of coins, a stripping area of the coin path including at least one stripping surface operable to retain at least one coin when overlapping another coin such that the other coin is separated from the at least one coin by the motion imparted by the rotatable disc, and a queuing area of the coin path that receives the plurality of coins from the stripping area, the queuing area including a beveled surface curving tangentially with the outer peripheral edge of the resilient pad to guide the coins in a single file configuration to a discrimination area.

According to various embodiments, a coin processing system for processing a plurality of coins of a mixed plurality of denominations having a plurality of diameters, comprises a rotatable disc including a resilient pad coupled thereto for imparting motion to the plurality of coins, the resilient pad being generally circular and including an outer peripheral edge, and a stationary sorting head. The stationary sorting head includes a lower surface generally parallel to and spaced a distance from the resilient pad, the lower surface forming a coin path for directing movement of each of the plurality of coins, a stripping area of the coin path including at least one stripping surface operable to retain at least one coin when overlapping another coin such that the other coin is separated from the at least one coin by the motion imparted by the rotatable disc, and a queuing area of the coin path that receives the plurality of coins from the stripping area, the queuing area including a beveled surface curving tangentially with the outer peripheral edge of the resilient pad to guide the coins in a single file configuration to a discrimination area.

In certain embodiments, the stripping area includes a first stripping ramp located at an initial edge of the stripping area and structured with an angle from the lower surface in a first direction that is tangential to a rotation of the rotatable disc. In certain embodiments, the angle of the first stripping ramp increases in a second direction that is a radial direction of the rotatable disc. In certain embodiments, an increase in the angle of the first stripping ramp is constant across the stripping area in the second direction. In certain embodiments, the coin processing system further includes a second stripping ramp located in the second direction, towards a center of the rotatable disc, from the first stripping ramp. In certain embodiments, the second stripping ramp is located in a counterclockwise direction in the first direction. In certain embodiments, an angle of the second stripping ramp increases in the second direction. In certain embodiments, an increase in the angle of the second stripping ramp is less than the increase of the angle of the first stripping ramp.

In certain embodiments, the beveled surface extends over the rotatable disc. In certain embodiments, the beveled surface is beveled to a zero depth just inboard of a perimeter of the rotatable disc.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A stationary sorting head for processing a plurality of coins of a mixed plurality of denominations having a plurality of diameters and a plurality of thicknesses, comprising:

a lower surface generally parallel to and spaced a distance from a resilient pad of a rotatable disc, the lower surface forming a coin path for directing movement of each of the plurality of coins, the resilient pad being generally circular and including an outer peripheral edge, and a queuing area of the coin path configured to guide the plurality of coins in a single file and single layer configuration to a discrimination area, the queuing area including a queuing channel having an inner queuing wall, the queuing channel having a first depth and a beveled surface curving tangentially with the outer peripheral edge of the resilient pad and extending from the first depth to a zero depth, wherein a portion of the queuing channel is at a second depth less than the first depth and the portion of the queuing channel at the second depth terminates adjacent to the outer peripheral edge of the resilient pad and where the queuing channel curves tangentially.

2. The stationary sorting head of claim 1, wherein the beveled surface extends from the first depth to the zero depth adjacent to the outer peripheral edge of the resilient pad.

3. The stationary sorting head of claim 1, wherein the beveled surface extends from the first depth to the zero depth at the outer peripheral edge of the resilient pad.

4. The stationary sorting head of claim 1, wherein the first depth of the queuing channel is less than a smallest thickness of the plurality of thicknesses.

5. The stationary sorting head of claim 1, wherein the inner queuing wall causes alignment of an inner most edge of each of the plurality of coins as the coins move through the queuing area.

6. The stationary sorting head of claim 1, wherein at an end of the queuing area near the discrimination area, a width of the queuing channel including the beveled surface is less than a smallest one of the plurality of diameters of the plurality of coins, such that each of the plurality of coins extends beyond the outer peripheral edge of the resilient pad when entering the discrimination area from the queueing area.

7. The stationary sorting head of claim 1, wherein the queuing area receives the plurality of coins from a stripping area of the coin path.

8. The stationary sorting head of claim 7, wherein the stripping area of the coin path includes at least one stripping surface operable to retain at least one coin when overlapping another coin such that the other coin is separated from the at least one coin by motion imparted by the rotatable disc.

9. The stationary sorting head of claim 1, wherein the portion of the queuing channel at the second depth includes a first rail extending from the second depth to the first depth, and a second rail extending from the second depth to the zero depth.

10. The stationary sorting head of claim 2, wherein a portion of the beveled surface further extends from the second depth to the zero depth adjacent to the outer peripheral edge of the resilient pad.

* * * * *